United States Patent
Zhu et al.

(10) Patent No.: US 10,880,873 B2
(45) Date of Patent: Dec. 29, 2020

(54) SUPPORT FOR LOCAL ACCESS IN A CELLULAR AND A NON-CELLULAR RAN

(71) Applicant: Intel Corporation, Santa Clara, CA (US)

(72) Inventors: Jing Zhu, Portland, OR (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/093,280

(22) PCT Filed: Sep. 26, 2016

(86) PCT No.: PCT/US2016/053795
§ 371 (c)(1),
(2) Date: Oct. 12, 2018

(87) PCT Pub. No.: WO2017/196385
PCT Pub. Date: Nov. 16, 2017

(65) Prior Publication Data
US 2019/0166596 A1   May 30, 2019

Related U.S. Application Data

(60) Provisional application No. 62/336,393, filed on May 13, 2016.

(51) Int. Cl.
*H04L 29/12* (2006.01)
*H04L 12/741* (2013.01)
(Continued)

(52) U.S. Cl.
CPC ....... *H04W 72/0413* (2013.01); *H04L 45/745* (2013.01); *H04L 61/2525* (2013.01);
(Continued)

(58) Field of Classification Search
None
See application file for complete search history.

(56) References Cited

U.S. PATENT DOCUMENTS

| 6,690,659 B1 * | 2/2004 | Ahmed | H04W 8/04 370/328 |
| 2004/0143734 A1 * | 7/2004 | Buer | H04L 63/0485 713/153 |

(Continued)

OTHER PUBLICATIONS

International Search Report dated Jan. 31, 2017 for International Application PCT/US2016/053795.
(Continued)

*Primary Examiner* — Kodzovi Acolatse
*Assistant Examiner* — The Hy Nguyen
(74) *Attorney, Agent, or Firm* — Schwabe, Williamson & Wyatt, P.C.

(57) ABSTRACT

A RAN-based cellular integration architecture is described that eliminates or minimizes required core network support. A local access gateway (LA-GW) node, which may be a logical and physical node, may provide an interface, with a cellular base station, and may forward downlink and/or uplink local IP packets that are then redirected to the cellular link. Network Address Translation (NAT) and a "local access" field are used to support transmission of local access packets over the cellular link.

22 Claims, 13 Drawing Sheets

(51) Int. Cl.
| | | |
|---|---|---|
| H04W 72/04 | (2009.01) | |
| H04W 8/08 | (2009.01) | |
| H04W 8/26 | (2009.01) | |
| H04W 84/12 | (2009.01) | |

(52) U.S. Cl.
CPC ......... H04L 61/2567 (2013.01); H04W 8/082 (2013.01); H04W 8/26 (2013.01); *H04L 61/6077* (2013.01); *H04W 84/12* (2013.01)

(56) References Cited

U.S. PATENT DOCUMENTS

| | | | | |
|---|---|---|---|---|
| 2012/0236733 | A1* | 9/2012 | Deu-Ngoc | H04L 43/16 370/252 |
| 2013/0058292 | A1* | 3/2013 | Wang | H04W 76/12 370/329 |
| 2013/0279456 | A1* | 10/2013 | Wang | H04L 12/2856 370/329 |
| 2013/0329714 | A1* | 12/2013 | Fan | H04W 40/12 370/338 |
| 2014/0003391 | A1* | 1/2014 | Vesterinen | H04L 47/34 370/331 |
| 2016/0164780 | A1* | 6/2016 | Timmons | H04L 45/70 370/238 |
| 2018/0262465 | A1* | 9/2018 | Maattanen | H04W 76/12 |
| 2019/0059015 | A1* | 2/2019 | Lee | H04W 88/04 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)." 3GPP TS 36.300 V13.3.0 (Mar. 2016). Lte Advanced Pro. 189 pages.

3rd Generation Partnership Project; Technical Specification Group Services and System Aspects; 3GPP system to Wireless Local Area Network (WLAN) interworking; System description (Release 10). 3GPP TS 23.234 V10.0.0 (Mar. 2011). 84 pages.

3GPP, "Technical Specification Group Services and System Aspects; Local IP Access and Selected IP Traffic Offload (LIPA-SIPTO)(Release 10)," 3GPP TR 23.829 V10.0.1 (Oct. 2011), Lte Advanced, 43 pages.

3GPP, "Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 13)," 3GPP TS 36.361 V13.0.0 (Mar. 2016), Lte Advanced Pro, 10 pages.

ETSI, "LTE; Evolved Universal Terrestrial Radio Access (E-UTRA) and Evolved Universal Terrestrial Radio Access Network (E-UTRAN); Overall description; Stage 2," ETSI TS 136 300 V13.2.0 (Jan. 2016), 3GPP TS 36.300 version 13.2.0 Release 13, 299 pages.

* cited by examiner

SUPPORT FOR LOCAL ACCESS IN A CELLULAR AND A NON-CELLULAR RAN

This application is a National Phase entry application of International Patent Application No. PCT/US2016/053795 filed Sep. 26, 2016, which claims priority to U.S. Provisional Patent Application No. 62/336,393, which was filed on May 13, 2016, entitled "SUPPORT OF LOCAL ACCESS IN A RAN-BASED 3GPP (LTE) AND NON-3GPP (WI-FI) INTEGRATED NETWORK" in the name of Jing Zhu et al. and is hereby incorporated by reference in its entirety.

BACKGROUND

Wireless cellular telecommunication networks include Radio Access Networks (RANs) that enable User Equipment (UE), such as smartphones, tablet computers, laptop computers, etc., to connect to a core network. An example of a wireless telecommunications network may include an Evolved Packet System (EPS) that operates based on 3rd Generation Partnership Project (3GPP) Communication Standards. In a cellular network, UEs typically communicate with base stations using channels corresponding to a licensed spectrum of radio frequencies (e.g., a spectrum of radio frequencies designated for cellular network communications).

More recently, technologies have been implemented to enable unlicensed spectrum to be used to assist or to supplement the network connectivity provided via the licensed spectrum. One such technology is the "Long Term Evolution (LTE) Wireless Local Area Network (WLAN) integration with Internet Protocol Security Tunnel (IPSec)" (LWIP). LWIP may enable WiFi RANs (i.e., unlicensed spectrum RANs) to be more optimally integrated into an LTE Access network. In particular, LWIP may be used to provide load balancing between LTE and WiFi through IP level switching or aggregation just above the Packet Data Convergence Protocol (PDCP) layer.

Another existing technology related to the convergence of the unlicensed licensed spectrum is Local IP Access (LIPA). Through LIPA, an IP-enabled device may access a consumer's home-based local area network as well as the broader Internet directly using the air interface of a femtocell or Home NodeB (HeNB). LIPA may rely on network support from the cellular core network, such as by allocating IP addresses to the device.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

As described herein, a RAN-based cellular (e.g., LTE) and WLAN (e.g., WiFi) integration architecture is described that eliminates or minimizes required core network support. In one implementation, a local (e.g., WiFi) connection and IP address, obtained from a WLAN, is leveraged such that the UE uses the locally assigned IP address (for local access communications) instead of an IP address assigned by the 3GPP cellular network. A local access gateway (LA-GW) node, which may be a logical and physical node, may provide an interface, with a cellular base station, and may forward downlink and/or uplink local IP packets that are then redirected to the cellular link. With these techniques, functionality similar to that provided by LIPA can be obtained without requiring support (e.g., the obtaining of IP addresses) from the core network.

Additionally, the architecture described herein may provide for IP level switching or aggregation between the cellular and WLAN links. Existing LWIP functions may be modified to implement Network Address Translation (NAT) to support transmission of local access packets over the cellular link. Additionally, a "local access" field may added to encapsulated local packets, transmitted over the cellular link, to enable processing of both local access packets and cellular link packets at the base station and the UE.

Figure 1:
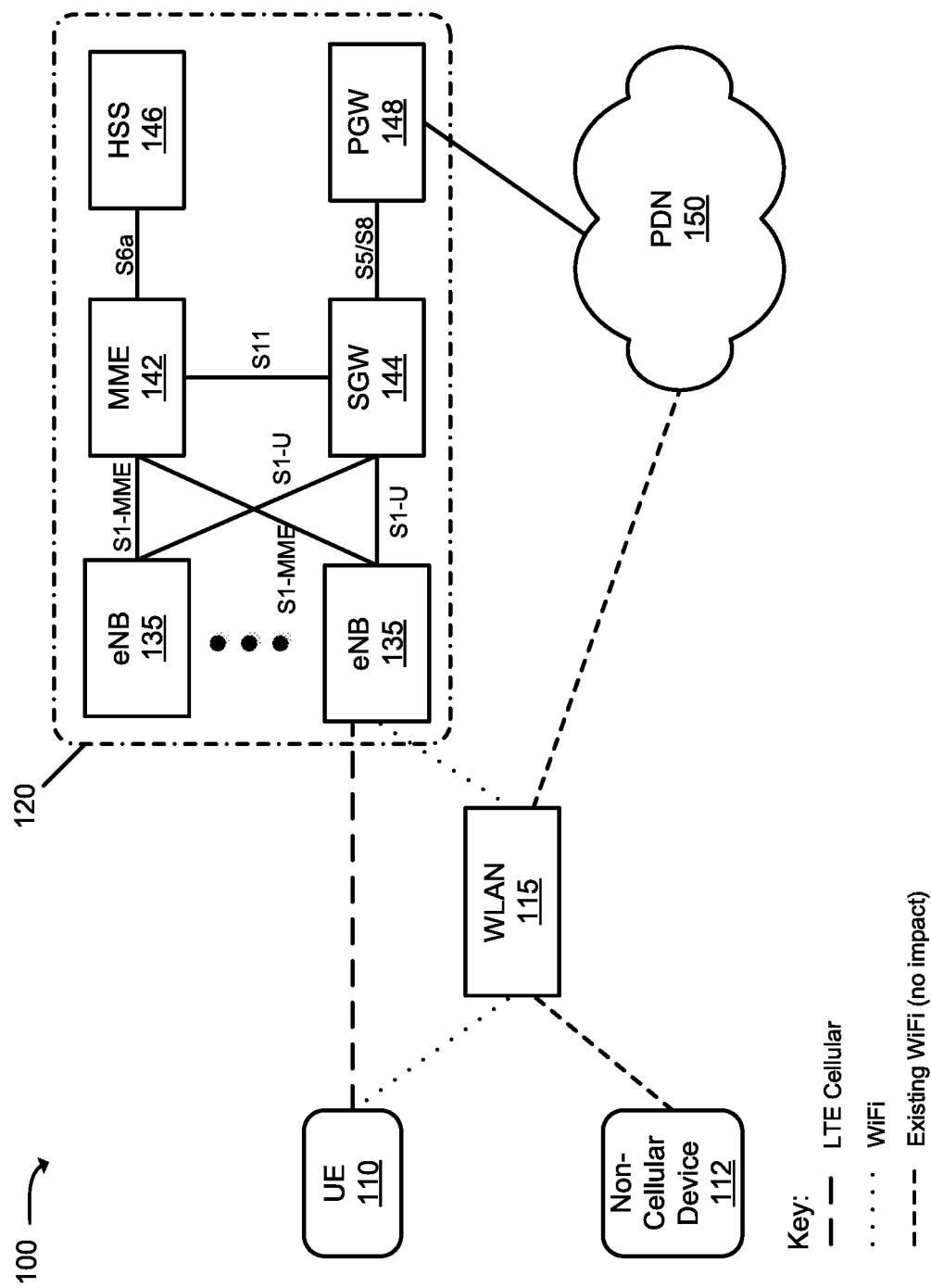
FIG. 1 is a diagram illustrating an example system in which systems and/or methods described herein may be implemented.

FIG. 1 is a diagram illustrating an example system 100 in which systems and/or methods described herein may be implemented. As illustrated, system 100 may include a telecommunications network in which LTE cellular and WLAN (e.g., WiFi) RANs co-exist. In particular, LWIP may be used to provide transparent aggregation of the LTE/WLAN radio links. As shown in FIG. 1, UE 110 may connect to cellular network 120 via either an LTE cellular link or, through WLAN 115, via a WiFi-based radio link (e.g., using unlicensed WiFi spectrum). Other devices, such as a non-cellular device 112 (e.g., a tablet computer) may continue to use WLAN 115 to connect to an external network, such as packet data network (PDN) 150 (e.g., the Internet). The use of LWIP may not impact the operation of non-cellular device 112 and WLAN 115. The link aggregation of the LTE/WLAN links may be transparent to core elements of cellular network 120 (i.e., to Mobility Management Entity (MME) 142, Serving Gateway (SGW) 144, Home Subscriber Server (HSS) 146, and packet data network gateway (PGW) 148).

WLAN 115 may represent one or more access devices, such as WiFi access point(s). WLAN 115 may be connected to PDN 150. Communication sessions with non-cellular devices, such as non-cellular device 112, may be routed via WLAN 115 to PDN 150. WLAN 115 may also be connected to base stations of cellular network 120, such as Evolved NodeB (eNB) 135.

UE 110 may include a portable computing and communication device, such as a personal digital assistant (PDA), a smart phone, a cellular phone, a laptop computer with connectivity to the wireless telecommunications network, a tablet computer, etc. UE 110 may also include a computing and communication device that may be worn by a user (also referred to as a wearable device) such as a watch, a fitness band, a necklace, glasses, an eyeglass, a ring, a belt, a headset, or another type of wearable device. UE 110 may also include radio circuitry capable of connecting to both cellular network 120 and WLAN 115. Non-cellular device 112 may represent a computing and communication device capable of connecting to WLAN 115.

eNBs 135 may implement the RAN of cellular network 120. eNBs 135 may provide the air (radio) interface for wireless connections with UEs 110. The core portion of cellular network 120 may be an IP-based network. The core portion may include a number of network devices, including MME 142, SGW 144, HSS 146, and PGW 148. Through the core portion, UEs 110 may communicate with an external network, such as PDN 150.

eNBs 135 may each include one or more network devices that receive, process, and/or transmit traffic destined for and/or received from UE 110 (e.g., via the air interface). eNBs 135 may include antennas and other logic necessary to wirelessly communicate with UEs 110. eNBs 135 may additionally communicate with other network devices in the core portion of cellular network 120. Although referred to as an "eNB," eNB 135 may generally represent any base station and/or RAN node that is implemented in a cellular network as a network device designed to wirelessly communicate with UEs.

MME 142 may include one or more computation and communication devices that act as a control node for eNBs 135 and/or other devices that provide the air interface for the wireless telecommunications network. For example, MME 142 may perform operations to register UEs 110 with the cellular network, to establish user plane bearer channels (e.g., traffic flows), to hand off UE 110 to different eNBs 135, MME, or another network, and/or to perform other operations. MME 142 may perform policing operations on traffic destined for and/or received from UEs 110.

SGW 144 may aggregate traffic received from one or more eNBs 135 and may send the aggregated traffic to an external network or device via PGW 148. Additionally, SGW 144 may aggregate traffic received from one or more PGWs 148 and may send the aggregated traffic to one or more eNBs 135. SGW 144 may operate as an anchor for the user plane during inter-eNB handovers and as an anchor for mobility between different telecommunication networks.

HSS 146 may include one or more devices that may manage, update, and/or store, in a memory associated with HSS 146, profile information associated with a subscriber (e.g., a subscriber associated with UE 110). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 110. Additionally, or alternatively, HSS 146 may perform authentication, authorization, and/or accounting operations associated with the subscriber and/or a communication session with UE 110.

PGW 148 may include one or more network devices that may aggregate traffic received from one or more SGWs 144, and may send the aggregated traffic to an external network. PGW 148 may also, or alternatively, receive traffic from the external network and may send the traffic toward UE 110 (via SGW 144 and/or eNB 135).

PDN 150 may include one or more packet networks, such as an Internet Protocol (IP) based packet network. PDN 150 may include a wide area network (WAN), a local area network (LAN), and/or combinations of WANs and LANs.

A number of communication interfaces, between the various components of the core portion of cellular network 120, are illustrated in FIG. 1. The communication interfaces may include 3GPP standardized interfaces. As illustrated, the interfaces may include: an S1-U interface between eNB 135 and SGW 144, an S1-MME interface between eNB 135 and MME 142, an S6a interface between MME 142 and HSS 146, and an S5/S8 interface between SGW 144 and PGW 148.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of system 100 may perform one or more functions described as being performed by another one or more of the devices of system 100.

Figure 2:
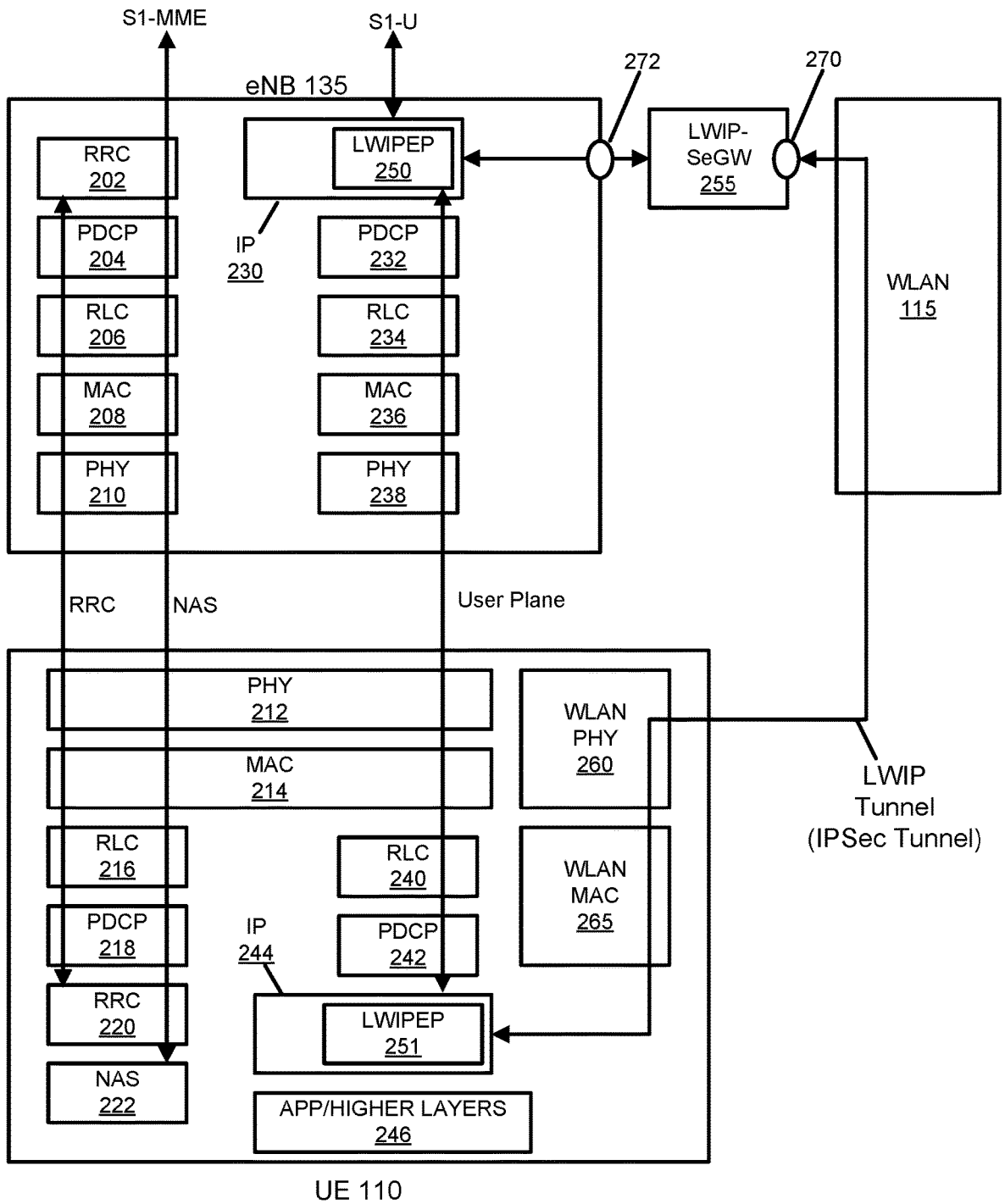
FIG. 2 is a diagram illustrating an example architecture relating to LWIP communications.

FIG. 2 is a diagram illustrating an example architecture relating to LWIP communications. In particular, communication layers associated with UE 110 and eNB 135 are illustrated. In LWIP, eNB 135 may act as the mobility anchor for the communications, and the management of the LTE cellular and WLAN links may be transparent to the cellular core network (e.g., transparent to MME 142, 144, HSS 146, PGW 148, etc.).

As shown in FIG. 2, the communication stack for control plane traffic (e.g., over the S1-MME interface), through eNB 135, may include Radio Resource Control (RRC) layer 202, Packet Data Convergence Protocol (PDCP) layer 204, Radio Link Control (RLC) layer 206, Media Access Control (MAC) layer 208, and Physical (PHY) layer 210. The corresponding communication stack for the control plane traffic, at UE 110, may include PHY layer 212, MAC layer 214, RLC layer 216, PDCP layer 218, RRC layer 220, and Non-Access Stratum (NAS) layer 222. The control plane traffic may particularly include RRC messages and NAS messages.

The communication stack for the LTE cellular user plane traffic, through eNB 135, may include IP layer 230, PDCP layer 232, RLC layer 234, MAC layer 236, and PHY layer 238. The corresponding communication stack for the user plane traffic, at UE 110, may include PHY layer 212, MAC layer 214, RLC layer 240, PDCP layer 242, and IP layer 244. The final destination for the user plane traffic may be UE applications, illustrated as app/higher layer component 246 in FIG. 2. Alternatively, user plane traffic, received over the cellular link, may be further transmitted to WLAN 115. In UE 110, a WLAN PHY layer 260 and WLAN MAC layer 265 may additionally be implemented to provide an interface to WLAN 115.

As mentioned, through LWIP, user plane data may be transmitted, between eNB 135 and UE 110, using either the LTE cellular user plane link, or the WLAN (e.g., WiFi) link. To implement the WLAN link, LWIP Encapsulation Protocol (LWIPEP) components 250 and 251 may be implemented, such as within IP layers 230 and 244, respectively. The user plane data may be transmitted over the WLAN link using IPSec tunnels as an "LWIP Tunnel". For instance, user plane IP packets, for the data radio bearer (DRBs) that would normally be used for the cellular LTE link, may be encapsulated and transmitted through the IPSec tunnel and via a WLAN link. LWIP Security Gateway (LWIP-SeGW) 255, which may be implemented within eNB 135 or outside of eNB 135, may manage the IPSec tunnels. On the WLAN side of LWIP gateway 255, a public IP address 270, which may be provided by eNB 135, may be presented to the WLAN. A private IP address 272, used for the cellular core network, may be presented to the eNB-side of LWIP gateway 255.

In operation, for the architecture shown in FIG. 2, UE 110 may establish a LWIP tunnel (i.e., an IPSec tunnel encapsulating IP packets from DRBs) with eNB 135 via WLAN 115 and through LWIP-SeGW 255. This architecture may be transparent to the deployment of the WLAN (i.e., no changes may be required to WLAN 115). Additionally, traffic steering and multi-Radio Access Technology (RAT) radio resource management may take place over the top of the cellular LTE user plane protocol stack (above PDCP).

Figure 3:
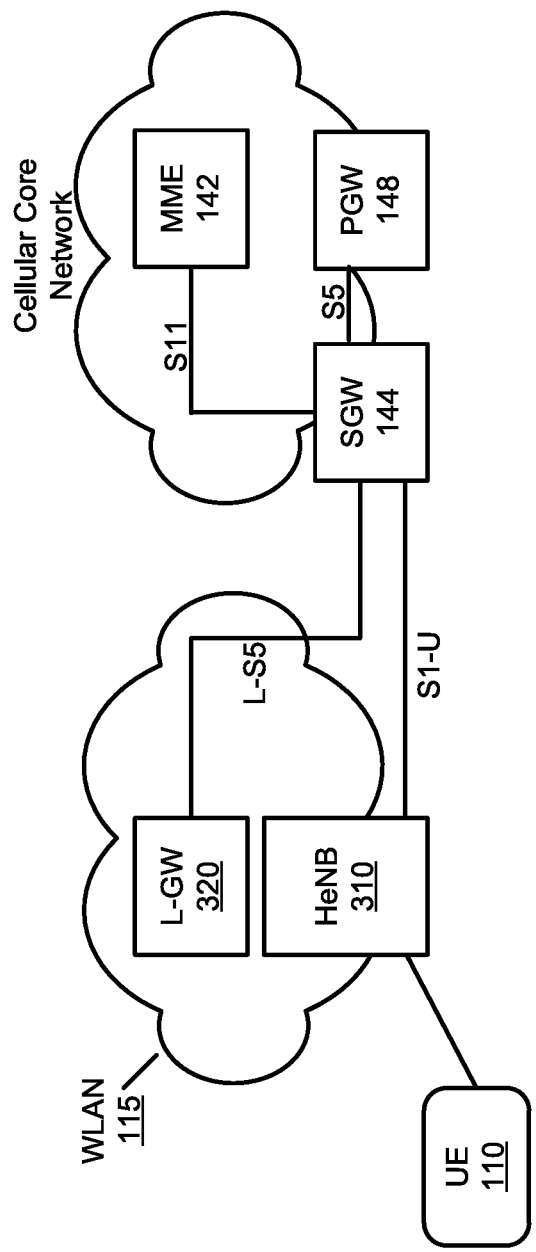
FIG. 3 is a diagram illustrating an example of the LIPA architecture.

FIG. 3 is a diagram illustrating an example of the LIPA architecture. LIPA may provide the ability for a UE to directly access home-based local area networks, as well as the broader Internet, using the air interface of a femtocell or HeNB. For example, with LIPA enabled, UE 110 may be able to devices is a local network, such as connected televisions, video servers, etc., over the HeNB (i.e., without interaction with the cellular network). As shown in FIG. 3, the LIPA architecture may include, at the user residence, HeNB 310 and a LIPA Gateway (L-GW) 320. In some implementations, L-GW 320 may be physically implemented as part of HeNB 310.

HeNB 310 may include a base station designed for home or office use, such as a relatively small or low power base station. HeNB 310 may connect (potentially through PDN 150) to SGW 144 using the S1-U interface. L-GW 320 may also connect (potentially through PDN 150) to SGW 144 using the L-S5 interface. L-GW 320 may be used to route UE traffic directly to IP-enabled devices that are connected to WLAN 115 (i.e., without going through the cellular core network). With LIPA, however, the cellular core may need to provide significant support to the operation of L-GW 320, such as by performing IP address allocation of a local IP address to UE 110.

Figure 4:
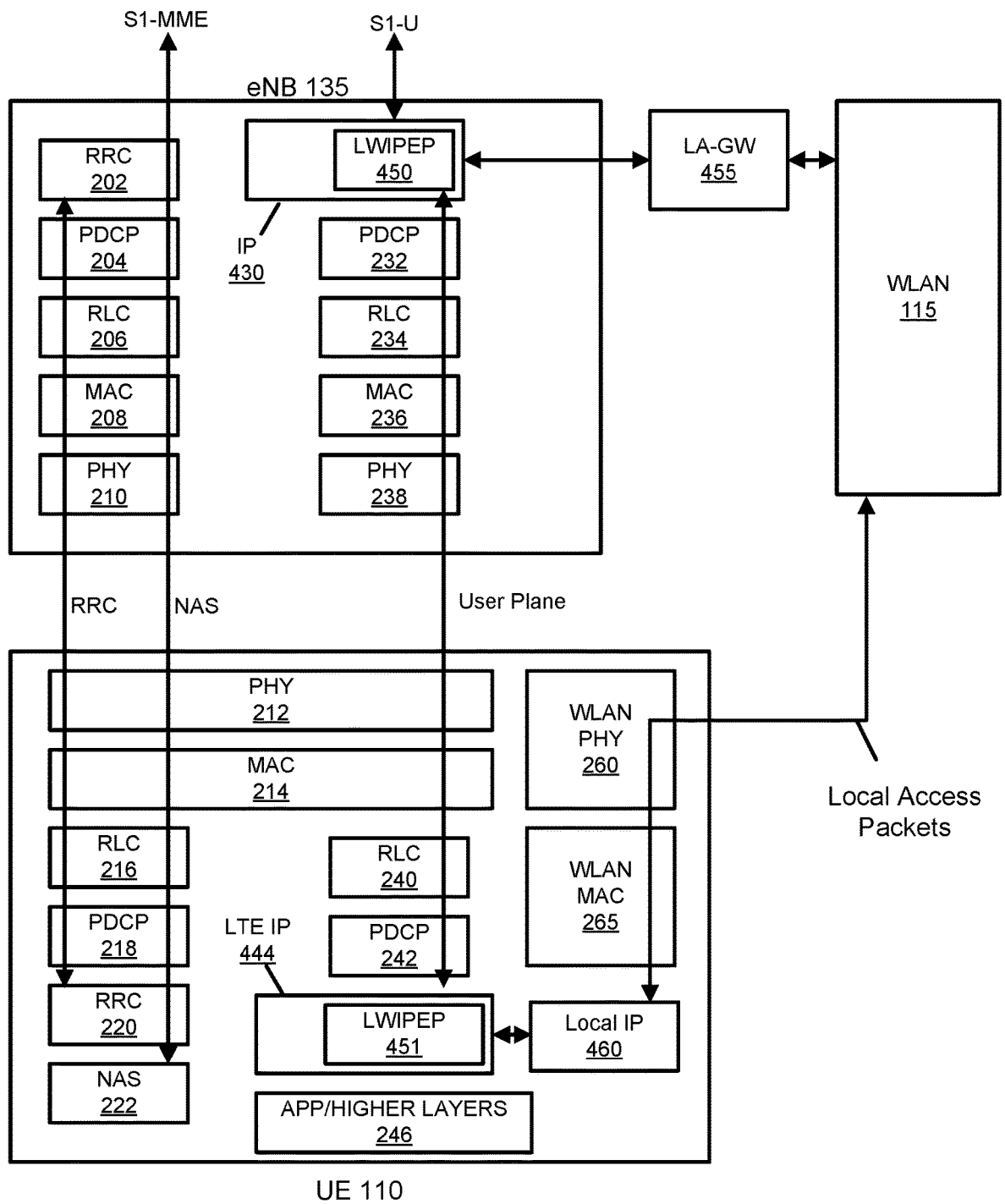
FIG. 4 is a diagram illustrating an example architecture consistent with aspects described herein.

FIG. 4 is a diagram illustrating an example architecture consistent with aspects described herein. In general, with the architecture shown in FIG. 4, UEs may directly access home-based local area networks without requiring support (or minimizing support) from the cellular core network. For instance, UE 110 may acquire an IP address, for local access, from the WLAN (e.g., from the local WiFi network). In comparison to the architectures shown in FIG. 2, in addition to transmitting cellular LTE packets over WLAN, in the architecture of FIG. 4, local access packets (e.g., WiFi packets) may be transmitted over the cellular LTE link.

FIG. 4 particularly illustrates a number of communication layers and/or functional components associated with UE 110, WLAN 115, and eNB 135. A number of the communication layers and/or functional components, shown in FIG. 4, may be similar to those shown in FIG. 2. For brevity, these elements are indicated with like numbers and may not be separately described with respect to FIG. 4. In FIG. 4, LWIP gateway 255 of FIG. 2 is replaced with Local Access Gateway (LA-GW) 455. Additionally, LWIPEP components 250 and 251 may have different functionality and are illustrated as LWIPEP components 450 and 451, respectively. Further, local IP layer 460 is illustrated as part of UE 110.

In the description of FIG. 4, the terms "cellular packets" or "cellular IP address" may refer to an IP address assigned by the cellular network. Cellular network 120 may require that packet traffic that is transmitted through the core of the cellular network be addressed using a cellular IP address. The terms "local IP address" or "local IP" may refer to an IP address that is assigned by WLAN 115. Packet traffic that is transmitted through WLAN 115 may be addressed using a local IP address.

LA-GW 455 may be implemented as a standalone communication device or as a functional component within eNB 135. In some implementations, LA-GW 455 may operate within a subnet associated with WLAN 115. LA-GW 455 may generally operate to forward local traffic between the local network (i.e., WLAN 115) and eNB 135.

LWIPEP components 450 and 451 may operate to encapsulate local access packets and to deliver the packets over the cellular LTE link. In contrast to the architecture shown in FIG. 2, it may not be necessary to use IPSec tunnels when transmitting the local access packets, since the cellular LTE link may be considered to be more secure than the WLAN links.

Local IP layer 460 may provide an interface, for UE 110, to WLAN 115. Local IP layer 460 may obtain local IP address from WLAN 115. In a Local access packets may be transmitted, via local IP layer 460, from UE 110 to WLAN 115. Additionally, local access packets may be received by local IP layer 460, from WLAN 115, and provided to LWIPEP component 451.

Figure 5A:
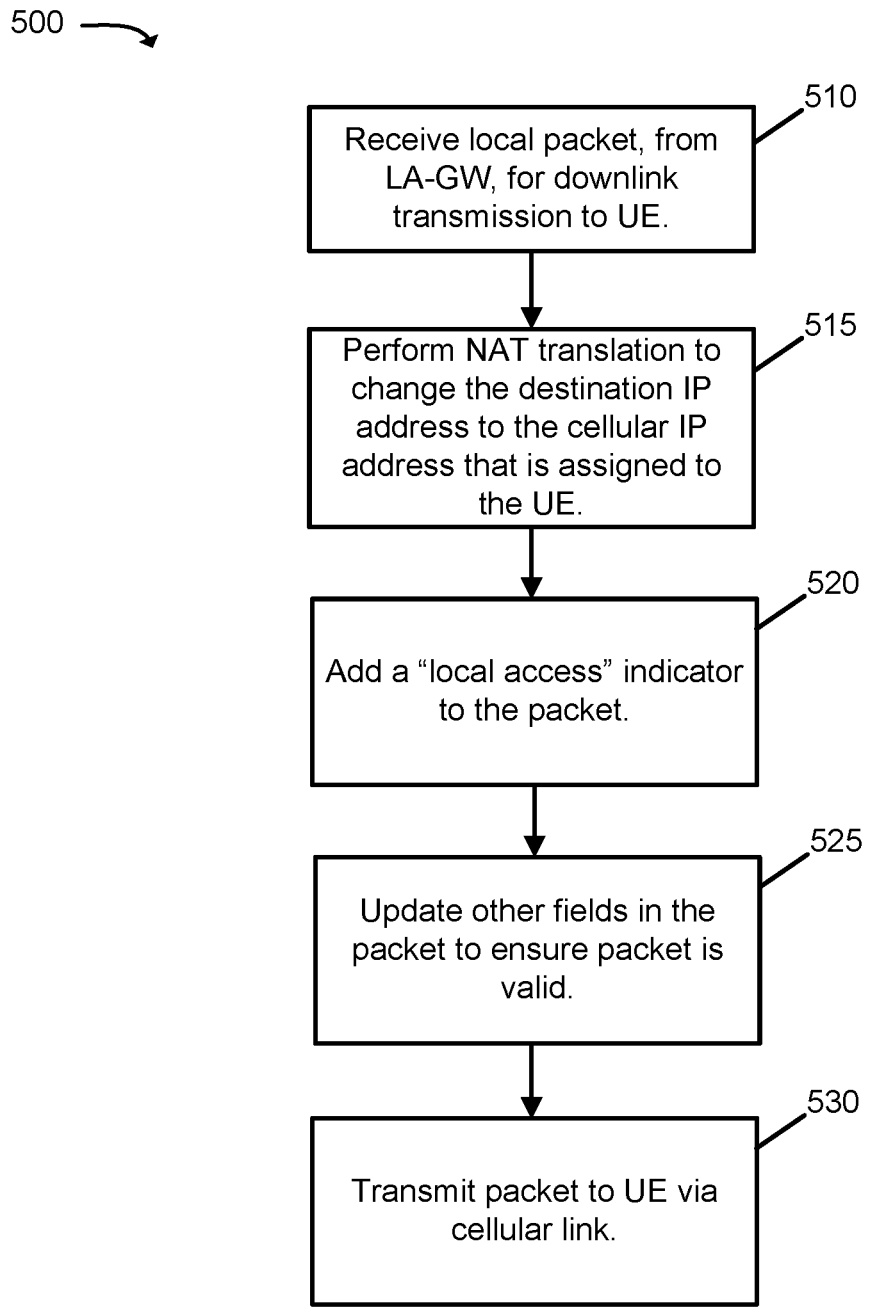
FIGS. 5A and 5B are flowcharts illustrating example downlink processes to support local access in the architecture shown in FIG. 4.
Figure 5B:
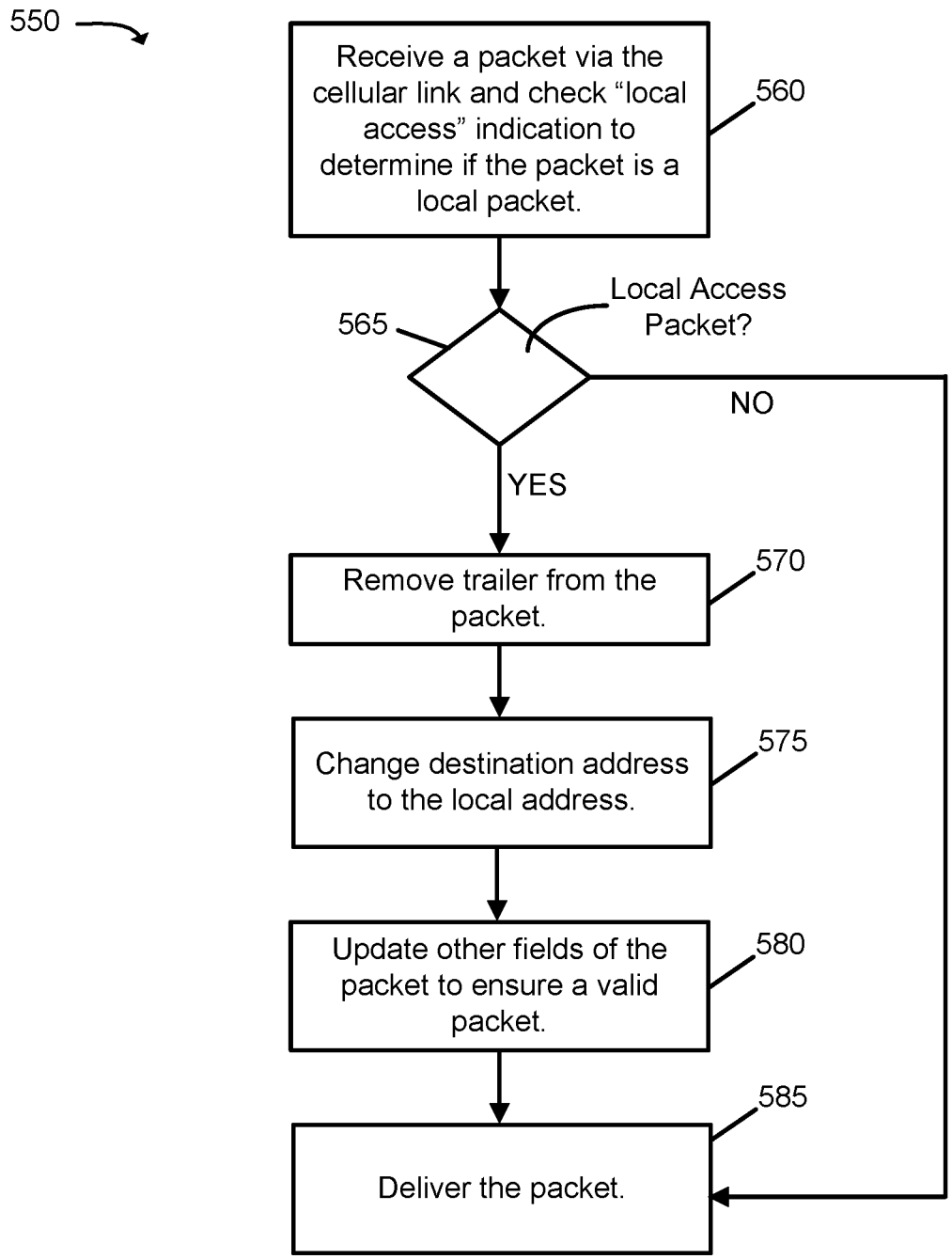

FIGS. 5A and 5B are flowcharts illustrating example downlink processes 500 and 550, respectively, to support local access in the architecture shown in FIG. 4. Process 500 may be implemented by, for example, LWIPEP component 450, acting as a transmitter, in eNB 135. Process 550 may be implemented by, for example, LWIPEP component 451, acting as a receiver, in UE 110. Processes 500 and 550 may together implement downlink transmission of local access packets.

In the operation of process 500, UE 110 may be assigned a cellular IP address (assigned by the cellular network) and a local IP address (assigned by WLAN 115, such as via normal operation of WLAN 115). LWIPEP component 450 may store the local IP address assigned to UE 110.

Process 500 may include receiving a local packet, from LA-GW 455, for downlink transmission to UE 110 (block 510). The local packet may have been originated, for example, by an IP-enabled device attached to WLAN 115. The local packet may be received by LWIPEP 450 of eNB 135.

Process 500 may further include performing Network Address Translation (NAT) to change the destination IP address of the received packet to the cellular IP address of UE 110 (block 515). Additionally, a "local address" indicator may be added to the packet (block 520). The local address indicator may indicate that the packet, although addressed using a cellular IP addresses, is actually a packet intended for local access. In some implementations, the local address indicator may be a one-bit value. In some implementations, the local address indicator may be added as a field that is included within additional control information that is added to the packet. The local address indicator and the additional control information will be referred to herein as the LWIP trailer for the packet. The additional control information of the LWIP trailer may include, for example, a field indicating the protocol type of the packet, a next header field (i.e., the IP address or header of the encapsulated packet), the length of the LWIP trailer, and/or potentially other information.

Process 500 may include updating other fields in the packet to ensure the packet is a valid packet (block 525). For example, a length field of the LWIP trailer may be updated and checksum fields for the packet may be updated. Also, the protocol type of the IP header may be set to a specific value (e.g. 114) to indicate the presence of the (LWIP) trailer. The valid packet may be transmitted to the UE via the cellular link (block 530).

As mentioned, process 550, as shown in FIG. 5B, may correspond to operations of LWIPEP component 451, acting as a receiver, in UE 110, in implementing downlink transmission of local packets. Process 550 may include receiving a packet via the cellular link and checking the local access indication to determine if the packet is a local packet (block 560). The local access indication may be, as previously mentioned, a particular bit that is set in the packet (e.g., in the LWIP trailer) when the packet is a packet that is sent over the cellular link but that has a final destination IP address that corresponds to WLAN 115.

When the packet is determined to be a local access packet (block 565, YES), process 550 may further include removing the trailer field that was added to the packet at eNB 135 (block 570). As mentioned, the trailer may be the LWIP trailer and may include the local access indicator as well as other information, such as the protocol type of the packet and the length of the trailer.

Process 550 may additionally include changing the destination address of the packet to the local address (block 575) and updating other fields of the packet to ensure a valid packet (block 580). Changing the destination address of the packet the local address may correspond to the reverse operation of the NAT operation performed in block 515. The local address may correspond to destination IP address associated with WLAN 115. Additionally, the protocol type of the packet may be changed back what was included in the "next header" field of the trailer. The packet may subsequently be delivered (block 585). The delivery destination of the packet may correspond to a higher layer/application at UE 110 and/or another device associated with WLAN 115 (e.g., the packet may be delivered to WLAN 115 for forwarding).

Figure 6:
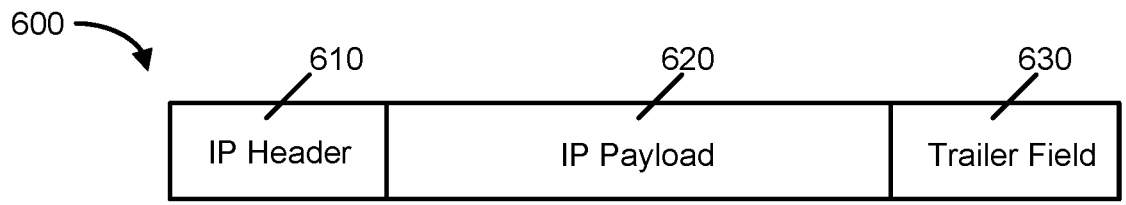
FIG. 6 is a diagram illustrating a format for a local access packet.

FIG. 6 is a diagram illustrating a format for a local access packet, such as a local access packet that is created and transmitted in process 500. As shown, local access packet 600 may include an IP header field 610. The IP header may correspond to the cellular IP address after NAT has been performed. Also, the protocol type field of the IP header may set to a specific value (e.g. 114) and indicate the presence of the trailer field 630. Local access packet 600 may additionally include IP payload field 620, which may correspond to an encapsulated version of the local access packet; and the trailer field 630. Trailer field 630, as previously mentioned, may include a bit that is set when IP payload field 630 includes the encapsulated version of the local access packet.

Trailer field 630 may also include the next header field that is set to the original value of the protocol type field of the IP header.

Figure 7:
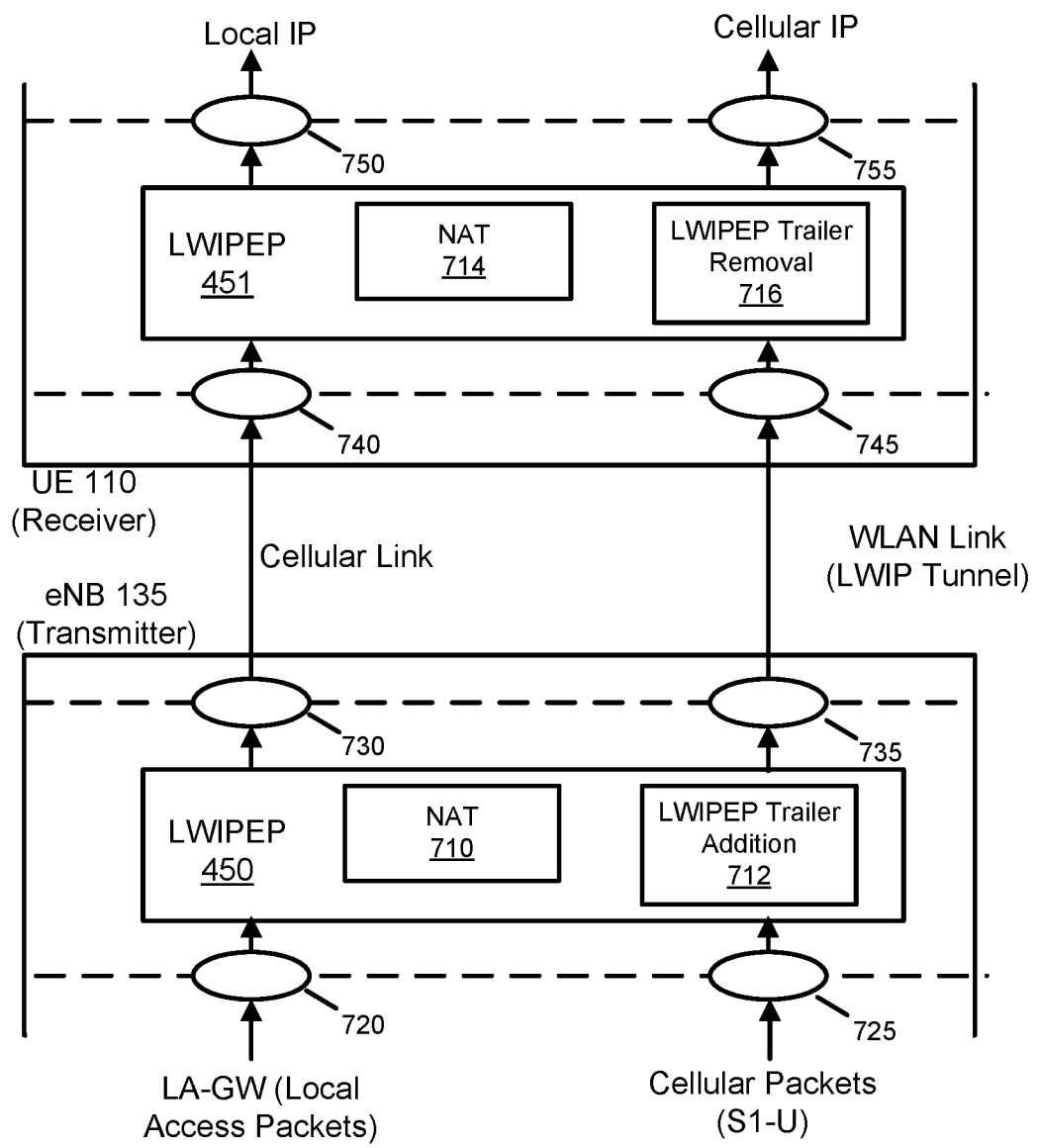
FIG. 7 is a diagram conceptually illustrating downlink transmission in the architecture of FIG. 4.

FIG. 7 is a diagram conceptually illustrating downlink transmission in the architecture of FIG. 4. The concepts illustrated in FIG. 7 may correspond to operations implemented by LWIPEP components 450 and 451, and may include the operations of processes 500 and 550. As shown, LWIPEP component 450 may include a NAT component 710 and a LWIPEP Trailer Addition Component 712. NAT component 710 may correspond to the functionality associated with performing the NAT translation (block 515) and LWIPEP Trailer Addition Component 712 may correspond to the functionality associated with adding the trailer information (e.g., the LWIPEP trailer that is added in blocks 520 and 525). Similarly, at UE 110, LWIPEP component 451 may include NAT component 714 and LWIPEP Trailer Removal Component 716. NAT component 714 may correspond to the functionality associated with changing the destination address to the local address (block 575) and LWIPEP Trailer Removal Component 716 may correspond to the functionality associated with removing the trailer information (block 570).

Additionally, in FIG. 7, ovals are used to represent interfaces. As shown, interface 720 represents the interface between LA-GW 455 and eNB 135; interface 725 represents the interface between the cellular core network (e.g., the S1-U interface) and eNB 135; interface 730 represents the interface between eNB 135 and the cellular link; interface 735 represents the interface between eNB 135 and the WLAN link (i.e., as a LWIP tunnel for transmitting cellular packets over WiFi); interface 740 represents the interface between the cellular link and UE 110; interface 745 represents the interface between the WLAN link and UE 110; interface 750 represents the interface between the UE 110 and the local access packets (e.g., higher layer applications in UE 110 or WLAN 115); and interface 755 represents the interface between UE 110 and received cellular packets.

In operation, traffic received at interface 720 (local access traffic) may be transmitted to UE 110 over the cellular link (i.e., through interface 720) after the performance of NAT by NAT component 710 and trailer addition by LWIPEP Trailer Addition component 712. At the receiving end (i.e., at UE 110), NAT component 714 and LWIPEP Trailer Removal Component 716 may correspondingly translate the IP address back to the local IP address and remove the LWIP trailer. Traffic received at interface 725 (cellular traffic) may be transmitted, to UE 110, via the cellular link as "normal" cellular traffic (i.e., without processing by LWIPEP component 450) or transmitted to UE 110 via the WLAN link (i.e., through interface 735). When transmitting over the WLAN link, LWIPEP Trailer Addition component 712 may add an LWIP trailer and transmit the cellular packet over an LWIP tunnel. In this situation, NAT is not needed.

Figure 8A:
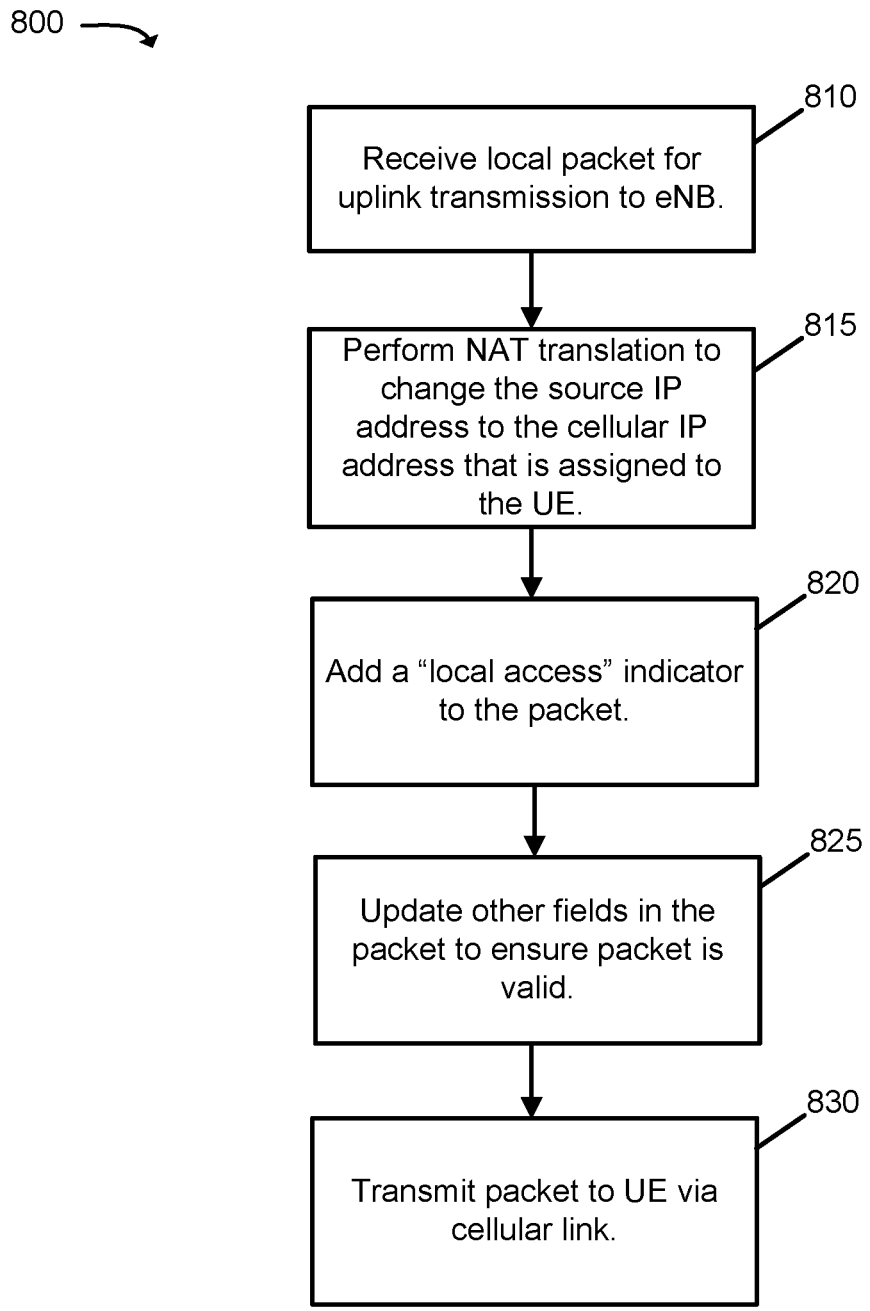
FIGS. 8A and 8B are flowcharts illustrating example uplink processes to support local access in the architecture shown in FIG. 4.
Figure 8B:
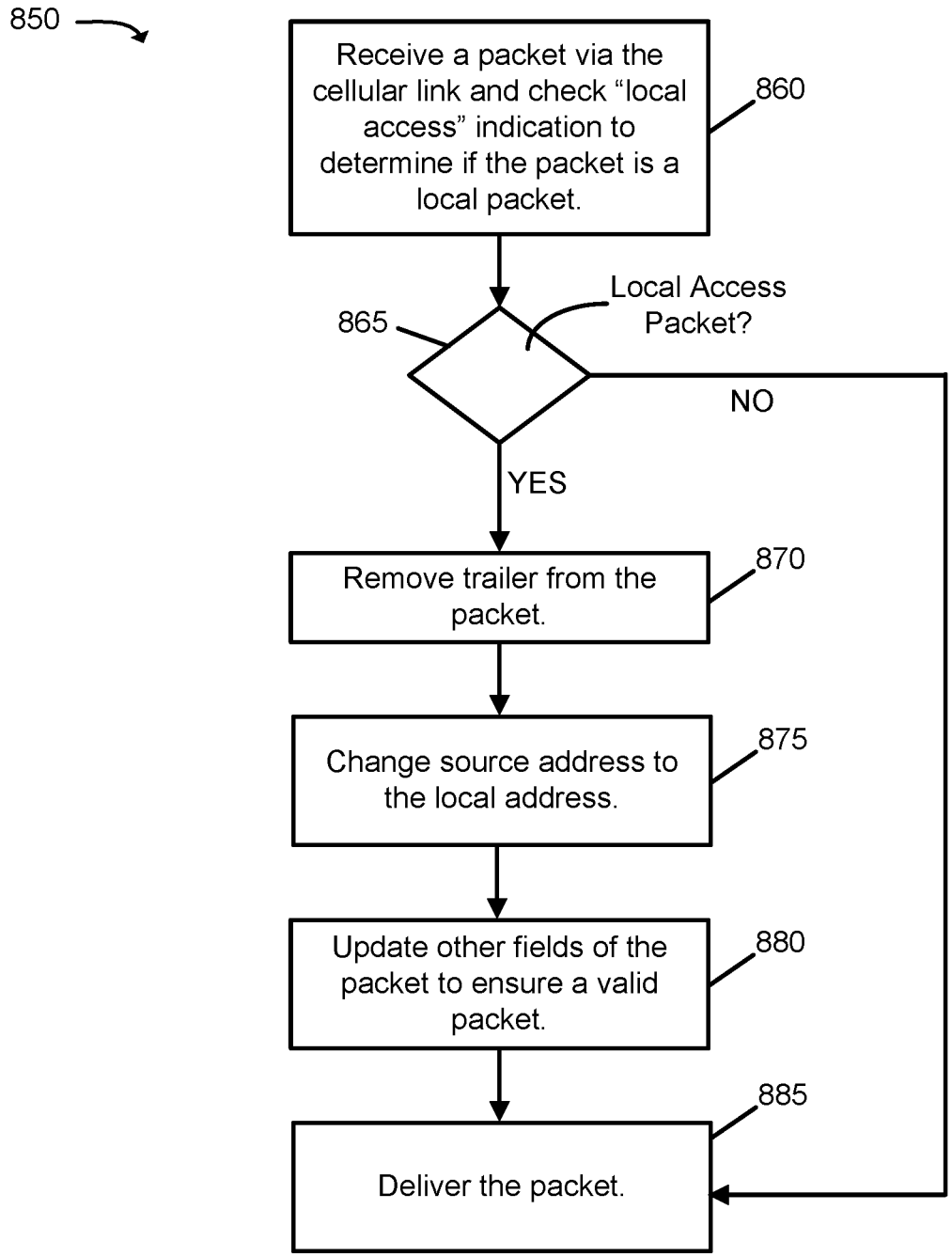

FIGS. 8A and 8B are flowcharts illustrating example uplink processes 800 and 850, respectively, to support local access in the architecture shown in FIG. 4. Process 800 may be implemented by, for example, LWIPEP component 451, acting as a transmitter, in UE 110. Process 850 may be implemented by, for example, LWIPEP component 450, acting as a receiver, in eNB 135. Processes 800 and 850 may together implement uplink transmission of local access packets through the cellular link.

Process 800 may include receiving a local packet, either from WLAN 115 or a local packet originated at UE 110 (e.g., by application/higher layers 246) (block 810). The local packet may be received by LWIPEP 451 of UE 110.

Process 800 may further include performing Network Address Translation (NAT) to change the source IP address of the received packet to the cellular IP address of UE 110 (block 815). Additionally, a "local address" indicator may be added to the packet (block 820). The local address indicator may indicate that the packet, although addressed using a cellular IP addresses, is actually a local access packet. As mentioned above, in some implementations, the local address indicator may be a one-bit value that is included within an LWIP trailer that is added to the end of the packet.

Process 800 may include updating other fields in the packet to ensure the packet is a valid packet (block 825). The valid packet may be transmitted to the UE via the cellular link (block 830).

As mentioned, process 850, as shown in FIG. 8B, may correspond to operations of LWIPEP component 450, acting as a receiver, in eNB 135, in implementing uplink transmission of local packets. Process 850 may include receiving a packet via the cellular link and checking the local access indication to determine if the packet is a local packet (block 860). The local access indication may be, as previously mentioned, a particular bit that is set in the packet (e.g., in the LWIP trailer) when the packet is a packet that is sent over the cellular link but that has a source IP address that corresponds to WLAN 115.

When the packet is determined to be a local access packet (block 865, YES), process 850 may further include removing the trailer field that was added to the packet at UE 110 (block 870). As mentioned, the trailer may be the LWIP trailer and may include the local access indicator as well as other information, such as the protocol type of the packet and the length of the trailer.

Process 850 may additionally include changing the source address of the packet to the local address (block 875) and updating other fields of the packet to ensure a valid packet (block 880). Changing the source address of the packet the local address may correspond to the reverse operation of the NAT operation performed in block 815. The local address may correspond to source IP address associated with WLAN 115. Change the protocol type of the IP header to what is included in the "next header" field of the trailer. The packet may subsequently be delivered (or forwarded for eventual delivery) (block 885). For example, the packet may be forwarded through the cellular core network.

Figure 9:
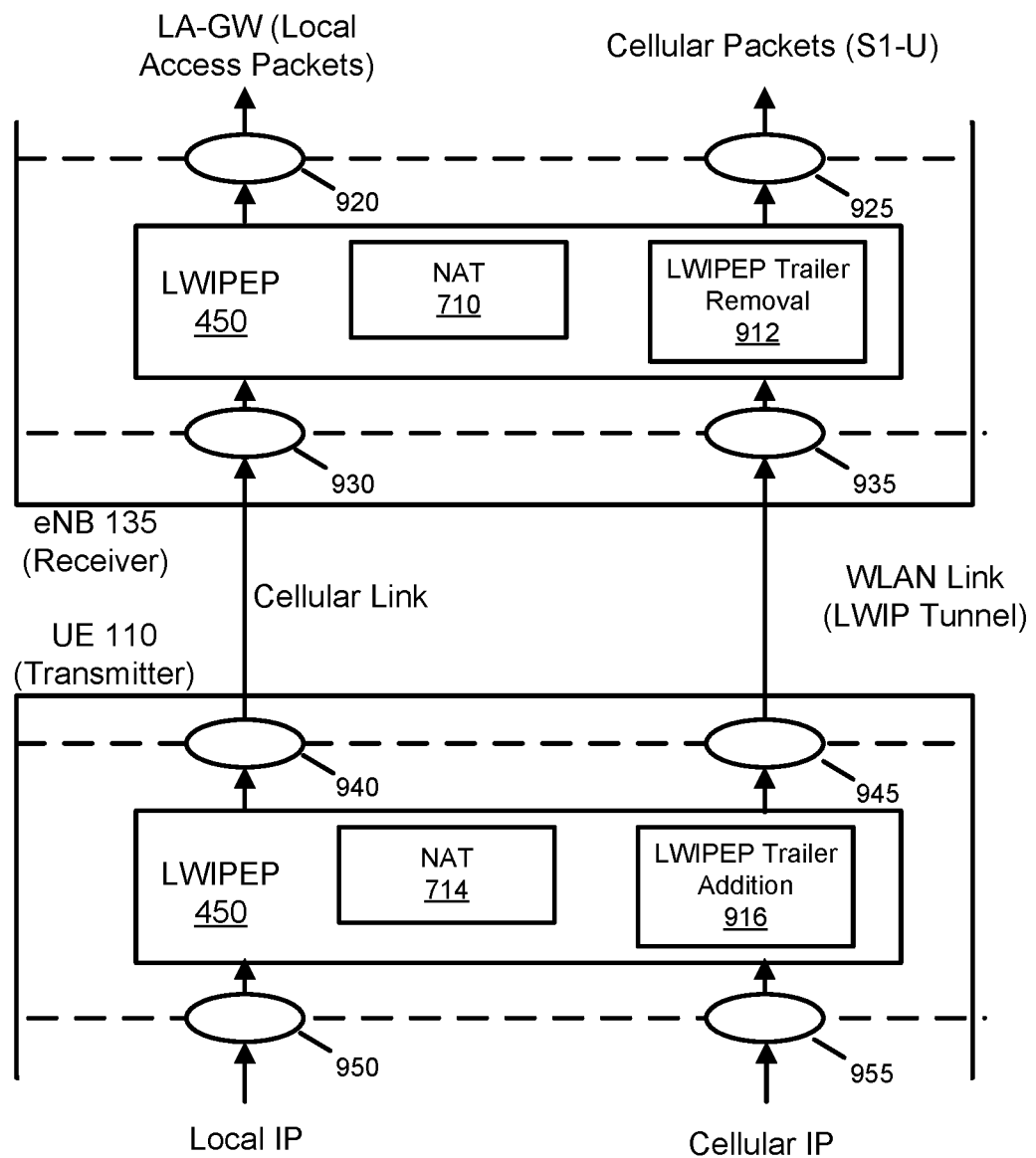
FIG. 9 is a diagram conceptually illustrating uplink transmission in the architecture of FIG. 4.

FIG. 9 is a diagram conceptually illustrating uplink transmission in the architecture of FIG. 4. The concepts illustrated in FIG. 9 may correspond to operations implemented by LWIPEP components 450 and 451, and may include the operations of processes 800 and 850.

As with FIG. 7, in FIG. 9, ovals are used to represent interfaces. As shown, interface 920 represents the interface between LA-GW 455 and eNB 135; interface 925 represents the interface between the cellular core network (e.g., the S1-U interface) and eNB 135; interface 930 represents the interface between eNB 135 and the cellular link; interface 935 represents the interface between eNB 135 and the WLAN link (i.e., as a LWIP tunnel for transmitting cellular packets over WiFi); interface 940 represents the interface between the cellular link and UE 110; interface 945 represents the interface between the WLAN link and UE 110; interface 950 represents the interface between the UE 110 and the local access packets (e.g., higher layer applications in UE 110 or WLAN 115); and interface 955 represents the interface between UE 110 and packets generated, by UE 110, for the cellular network.

In operation, traffic received or generated for interface 950 (local access traffic) may be transmitted by UE 110 over the cellular link (i.e., through interface 940) after the performance of NAT by NAT component 714 and trailer addition by LWIPEP Trailer Addition component 716. At the receiving end (i.e., at eNB 135), NAT component 710 and LWIPEP Trailer Removal component 912 may correspondingly translate the source IP address back to the local IP address and remove the LWIP trailer. Traffic received at interface 955 (cellular traffic) may be transmitted, to eNB 135, via the cellular link as "normal" cellular traffic (i.e., without processing by LWIPEP component 450) or transmitted to eNB 135 via the WLAN link (i.e., through interface 945). When transmitting over the WLAN link, LWIPEP Trailer Addition component 916 may add an LWIP trailer and transmit the cellular packet over an LWIP tunnel.

Figure 10:
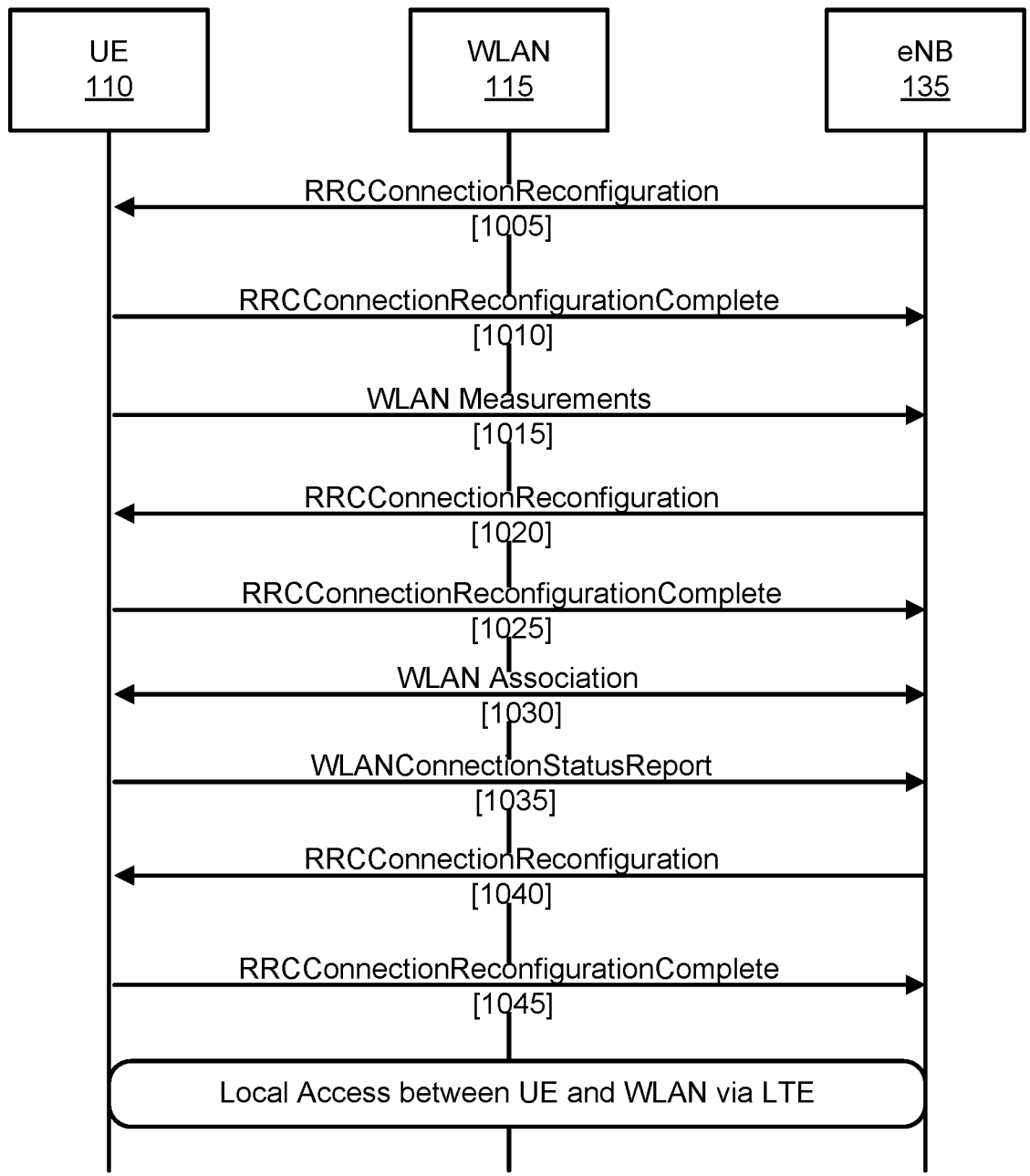
FIG. 10 is a signal diagram illustrating RRC signaling for an example setup procedure.

The setup/provisioning of the above-discussed RAN-based local access will next be discussed with reference to FIG. 10. FIG. 10 is a signal diagram illustrating RRC signaling for an example setup procedure.

The signal diagram in FIG. 10 may be based on the existing LWIP tunnel setup procedure to support local access. For instance, communications 1005-1035 may be based on the existing LWIP tunnel setup procedure. These communications may include eNB 135 initially transmitting a "RRCConnectionReconfiguration" message (at 1005) to UE 110, which may responds with a "RRCConnectionReconfigurationComplete" message (at 1010). UE 110 may record measurements relating to the quality of the WLAN connection, such as the received signal strength. UE 110 may transmit a message reporting the WLAN measurements (at 1015, "WLAN Measurements"). eNB 135 may potentially reconfigure the connection based on the measurement report (at 1020 and 1025, "RRCConnectionReconfiguration" and "RRCConnectionReconfigurationComplete"). UE 110 may connect/associate to WLAN 115 (at 1030) and, in response to the connection with WLAN 115, report the connection to eNB 135 (at 1035, "WLANConnectionStatusReport").

eNB 135 may send an additional "RRCConnectionReconfiguration" message, which may include a parameter that indicates that the eNB supports local access (at 1040). If UE 110 supports local access, the UE may response by sending the "RRCConnectionReconfigurationComplete" message, including a parameter that includes the local IP address (e.g., the WiFi IP address that was assigned by the WLAN) of UE 110 (at 1045). At this point, local access, as described previously, between UE 110 and WLAN 115, using the cellular links, may be supported (at 1050).

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 11:
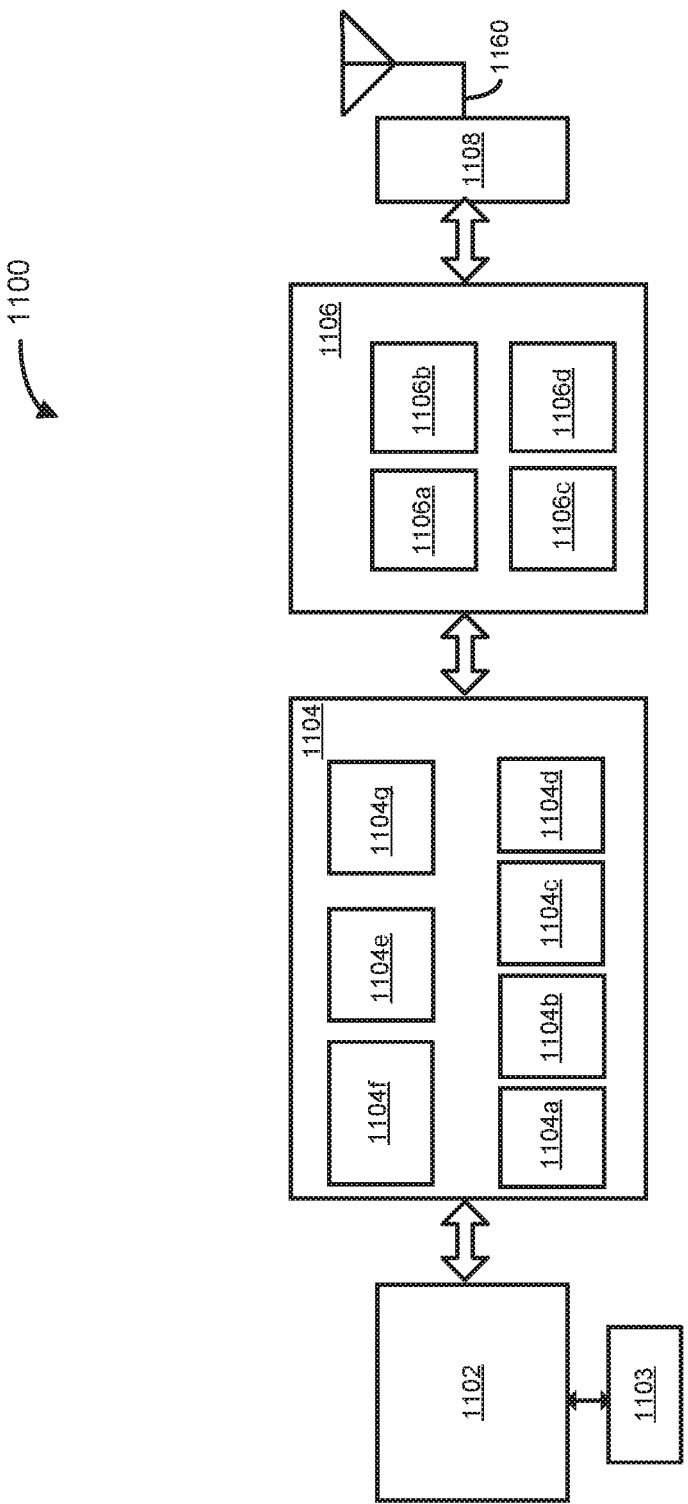
FIGS. 11 and 12 are diagrams illustrating, for various embodiments, example components of an electronic device.

Embodiments described herein may be implemented into a system using any suitably configured hardware and/or software. FIG. 11 illustrates, for one embodiment, example components of an electronic device 1100. In embodiments, the electronic device 1100 may be a mobile device, a RAN node, a network controller, a subscription repository, a data gateway, a service gateway, or an application server. In some embodiments, the electronic device 1100 may include application circuitry 1102, baseband circuitry 1104, Radio Frequency (RF) circuitry 1106, front-end module (FEM) circuitry 1108 and one or more antennas 1160, coupled together at least as shown. In embodiments in which a radio interface is not needed for electronic device 1100 (e.g., a data gateway, network controller, etc.), the RF circuitry 1106, FEM circuitry 1108, and antennas 1160 may be omitted. In other embodiments, any of said circuitries can be included in different devices.

Application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory/storage may include, for example, computer-readable medium 1103, which may be a non-transitory computer-readable medium. Application circuitry 1102 may, in some embodiments, connect to or include one or more sensors, such as environmental sensors, cameras, etc.

Baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104*a*, third generation (3G) baseband processor 1104*b*, fourth generation (4G) baseband processor 1104*c*, and/or other baseband processor(s) 1104*d* for other existing generations, generations in development or to be developed in the future (e.g., fifth generation (5G), 11G, etc.). The baseband circuitry 1104 (e.g., one or more of baseband processors 1104*a-d*) may handle various radio control functions that enable communication with one or more radio networks via the RF circuitry 1106. The radio control functions may include, but are not limited to, signal modulation/demodulation, encoding/decoding, radio frequency shifting, etc. In some implementations, the functionality of baseband circuitry 1104 may be wholly or partially implemented by memory/storage devices configured to execute instructions stored in the memory/storage. The memory/storage may include, for example, a non-transitory computer-readable medium 1104*h*.

In some embodiments, modulation/demodulation circuitry of the baseband circuitry 1104 may include Fast-Fourier Transform (FFT), preceding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 1104*e* of the baseband circuitry 1104 may be configured to run elements of the protocol stack for signaling of the PHY, MAC, RLC, PDCP and/or RRC layers, and/or NAS. In some embodiments, the baseband circuitry may include one or more audio digital signal processor(s) (DSP) 1104*f*. The audio DSP(s) 1104*f* may be include elements for compression/decompression and echo cancellation and may include other suitable processing elements in other embodiments.

Baseband circuitry 1104 may further include memory/storage 1104*g*. The memory/storage 1104*g* may be used to load and store data and/or instructions for operations performed by the processors of the baseband circuitry 1104. Memory/storage 1104*g* may particularly include a non-transitory memory. Memory/storage for one embodiment may include any combination of suitable volatile memory and/or non-volatile memory. The memory/storage 1104*g* may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1104*g* may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106*a*, amplifier circuitry 1106*b* and filter circuitry 1106*c*. The transmit signal path of the RF circuitry 1106 may include filter circuitry 1106*c* and mixer circuitry 1106*a*. RF circuitry 1106 may also include synthesizer circuitry 1106*d* for synthesizing a frequency for use by the mixer circuitry 1106*a* of the receive signal path and the transmit signal path. In some embodiments, the mixer circuitry 1106*a* of the receive signal path may be configured to down-convert RF signals received from the FEM circuitry 1108 based on the synthesized frequency provided by synthesizer circuitry 1106*d*. The amplifier circuitry 1106*b* may be configured to amplify the down-converted signals and the filter circuitry 1106*c* may be a low-pass filter (LPF) or band-pass filter (BPF) configured to remove unwanted signals from the down-converted signals to generate output baseband signals.

Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*. The filter circuitry 1106*c* may include a low-pass filter (LPF), although the scope of the embodiments is not limited in this respect.

In some embodiments, the mixer circuitry 1106*a* of the receive signal path and the mixer circuitry 1106*a* of the transmit signal path may include two or more mixers and may be arranged for quadrature downconversion and/or upconversion respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* may be arranged for direct downconversion and/or direct upconversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106*d* may be a fractional-N synthesizer or a fractional N/N+6 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+6 synthesizer.

In some embodiments, frequency input may be provided by a voltage-controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106*d* of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1160, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1160.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1160).

In some embodiments, the electronic device 1100 may include additional elements such as, for example, memory/storage, display, camera, sensors, and/or input/output (I/O)

interface. In some embodiments, the electronic device of FIG. 11 may be configured to perform one or more methods, processes, and/or techniques such as those described herein.

Figure 12:
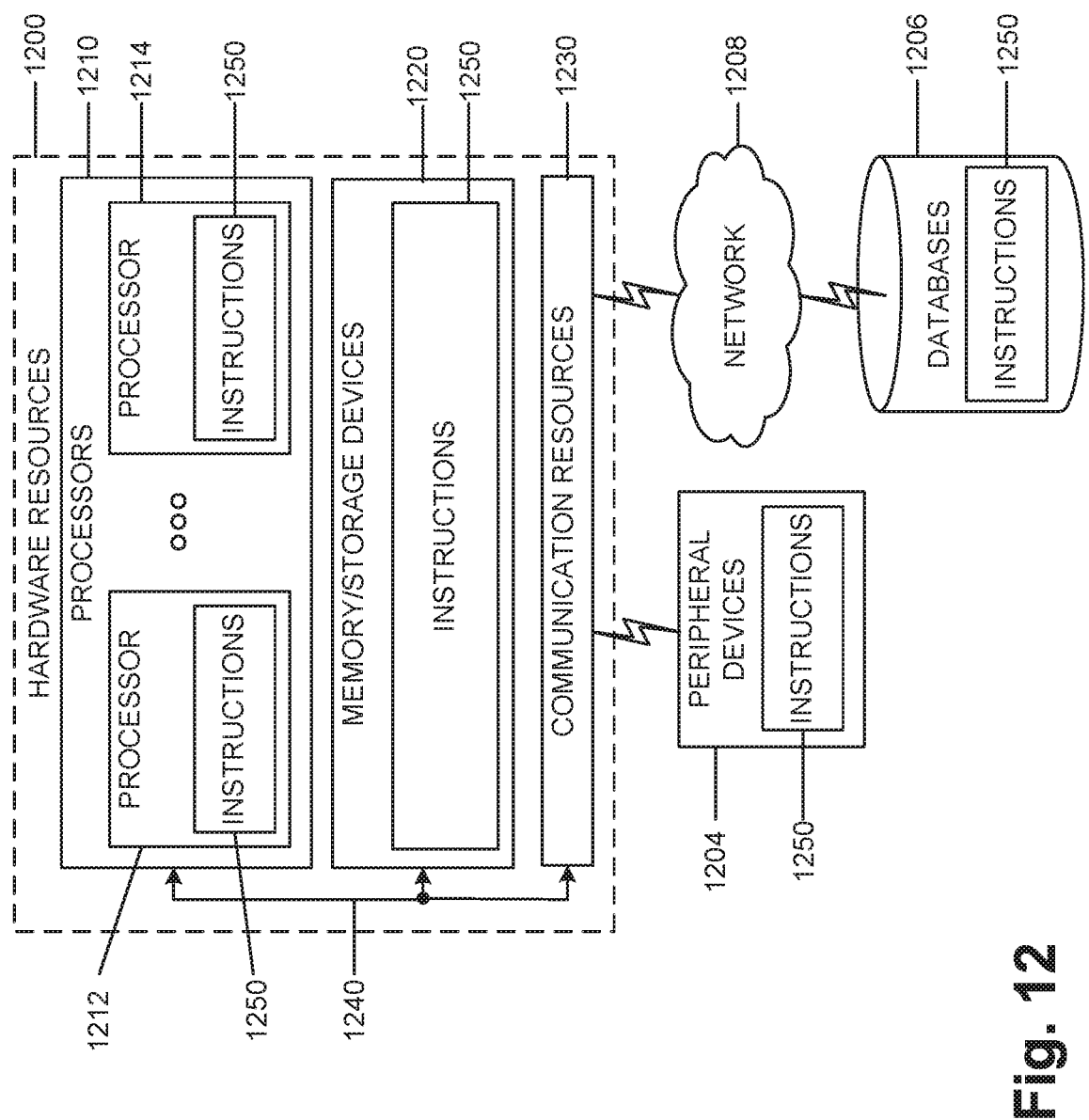

FIG. 12 is a block diagram illustrating components, according to some example embodiments, able to read instructions from a machine-readable or computer-readable medium (e.g., a machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which are communicatively coupled via a bus 1240.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214. The memory/storage devices 1220 may include main memory, disk storage, or any suitable combination thereof.

The communication resources 1230 may include interconnection and/or network interface components or other suitable devices to communicate with one or more peripheral devices 1204 and/or one or more databases 1206 via a network 1208. For example, the communication resources 1230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 and/or the databases 1206. Accordingly, the memory of processors 1210, the memory/storage devices 1220, the peripheral devices 1204, and the databases 1206 are examples of computer-readable and machine-readable media.

A number of examples, relating to implementations of the techniques described above, will next be given.

In a first example, User Equipment (UE) for a cellular communications network may include a radio component to communicate with a Wireless Local Area Network (WLAN) and the cellular communications network; and processing circuitry to: store a local access Internet Protocol (IP) address obtained from a Wireless Local Area Network (WLAN); store a cellular IP address associated with the cellular communications network; and transmit a first packet, associated with the WLAN, via a cellular link of the cellular communications network, the transmission of the first packet including performing Network Address Translation (NAT) on the first packet to change a source IP address of the first packet from the local access IP address to the cellular IP address, and setting a local access field of the first packet to indicate that the first packet is a local access packet.

In example 2, the subject matter of example 1, wherein the local access field includes a one-bit field that is added in a trailer section to the first packet.

In example 3, the subject matter of example 1, or any of the examples herein, wherein the processing circuitry is further to: transmit, in response to a message from a base station of the cellular communications network that the base station supports communications of local access packets, the local access IP address to the base station.

In example 4, the subject matter of example 3, or any of the examples herein, wherein the message is a Radio Resource Control (RRC) message.

In example 5, the subject matter of any of examples 1, 2, or 3, or any of the examples herein, wherein the processing circuitry is further to: receive a second packet via the cellular link; determine, based on a presence of the local access field, whether the second packet is a local access packet; and when the second packet is determined to be a local access packet, change a destination field of the second packet to the local access IP address.

In example 6, the subject matter of example 5, or any of the examples herein, wherein the processing circuitry is further to: remove a trailer field from the second packet; and deliver the second packet to an application layer of the UE.

In example 7, the subject matter of example 1, or any of the examples herein, wherein the processing circuitry is further to transmit the local address, to a base station and via the cellular link, as part of a RRCConnectionReconfigurationComplete message.

In a eighth example, an apparatus for a baseband processor of User Equipment (UE) for a cellular communication network may include a computer-readable medium to store processing instructions; and processing circuitry to execute the processing instructions to: store a local access Internet Protocol (IP) address obtained from a Wireless Local Area Network (WLAN); store a cellular IP address associated with the cellular communications network; and process a first packet, associated with the WLAN, for transmission via a cellular link of the cellular communications network, the processing of the first packet including performing Network Address Translation (NAT) on the first packet to change a source IP address of the first packet from the local access IP address to the cellular IP address, and set a local access field of the first packet to indicate that the first packet is a local access packet.

In example 9, the subject matter of example 8, or any of the examples herein, wherein the local access field includes a one-bit field that is added in a trailer section to the first packet.

In example 10, the subject matter of example 8, or any of the examples herein, wherein the processing circuitry is further to: transmit, in response to a message from a base station of the cellular communications network that the base station supports communications of local access packets, the local access IP address to the base station.

In example 11, the subject matter of example 10, or any of the examples herein, wherein the message is a Radio Resource Control (RRC) message.

In example 12, the subject matter of any of examples 8, 9, or 10, or any of the examples herein, wherein the processing circuitry is further to: receive a second packet via the cellular link; determine, based on a presence of the local access field, whether the second packet is a local access packet; and when the second packet is determined to be a local access packet, changing a destination field of the second packet to the local access IP address.

In example 13, the subject matter of example 8, or any of the examples herein, wherein the processing circuitry is further to: remove a trailer field from the second packet; and deliver the second packet to an application layer of the UE.

In a 14$^{th}$ example, an evolved NodeB (eNB), associated with a cellular communications network, comprises a Local Access Gateway (LA-GW) node to connect the eNB to a Wireless Local Area Network (WLAN) to receive local access packets, from the WLAN, that are destined for User Equipment (UE) that is attached to the eNB via a cellular radio link; and logic to: process the received local access packets to change a destination Internet Protocol (IP) address of the local access packets to an IP address that is associated with the cellular communications network, and insert a local access field to the received local access packets to indicate that the local access packets are associated with the WLAN; and radio frequency (RF) circuitry to transmit the local access packets over the cellular link.

In example 15, the subject matter of example 14, or any of the examples herein, wherein the logic is further to: encapsulate a payload of the local access packets when transmitting the local access packets over the cellular link.

In example 16, the subject matter of example 14, or any of the examples herein, wherein local access field includes a one-bit field that is added in a trailer section of the local access packets.

In example 17, the subject matter of example 14, or any of the examples herein, wherein the logic is further to: receive a local access IP address, of the UE, from the UE.

In example 18, the subject matter of example 17, or any of the examples herein, wherein the local access IP address of the UE is received as part of a Radio Resource Control (RRC) message transmitted over the cellular link.

In example 18, the subject matter of examples 15, 16, or 17, or any of the examples herein, wherein the logic is further to: receive a second packet via the cellular link; determine, based on a presence of the local access field, whether the second packet is a local access packet; and when the second packet is determined to be a local access packet, changing a source field of the second packet to the local access IP address of the UE.

In a 20$^{th}$ example, a computer-readable medium containing program instructions for causing one or more processors, associated with User Equipment (UE) operable with a cellular communications network, to: store a local access Internet Protocol (IP) address obtained from a Wireless Local Area Network (WLAN); store a cellular IP address associated with the cellular communications network; and process a first packet, associated with the WLAN, via a cellular link of the cellular communications network, the processing of the first packet including performing Network Address Translation (NAT) on the first packet to change a source IP address of the first packet from the local access IP address to the cellular IP address, and setting a local access field of the first packet to indicate that the first packet is a local access packet.

In example 21, the subject matter of example 20, or any of the examples herein, wherein the local access field includes a one-bit field that is added in a trailer section to the first packet.

In example 22, the subject matter of example 20, or any of the examples herein, wherein the program instructions further cause the one or more processors to: transmit, in response to a message from a base station of the cellular communications network that the base station supports communications of local access packets, the local access IP address to the base station.

In example 23, the subject matter of example 22, or any of the examples herein, wherein the message is a Radio Resource Control (RRC) message.

In example 24, the subject matter of one of examples 20, 21 or 22, or any of the examples herein, wherein the program instructions further cause the one or more processors to: receive a second packet via the cellular link; determine, based on a presence of the local access field, whether the second packet is a local access packet; and when the second packet is determined to be a local access packet, changing a destination field of the second packet to the local access IP address.

In example 25, the subject matter of example 24, or any of the examples herein, wherein the logic is further to: remove a trailer field from the second packet; and deliver the second packet to an application layer of the UE.

In a 26$^{th}$ example, a method, implemented by User Equipment (UE) associated with a cellular communications network, comprises: storing a local access Internet Protocol (IP) address obtained from a Wireless Local Area Network (WLAN); storing a cellular IP address associated with the cellular communications network; and transmitting a first packet, associated with the WLAN, via a cellular link of the cellular communications network, the transmission of the first packet including performing Network Address Translation (NAT) on the first packet to change a source IP address of the first packet from the local access IP address to the cellular IP address, and setting a local access field of the first packet to indicate that the first packet is a local access packet.

In example 27, the subject matter of example 26, or any of the examples herein, wherein the local access field includes a one-bit field that is added in a trailer section to the first packet.

In example 28, the subject matter of example 26, or any of the examples herein, further comprising: transmitting, in response to a message from a base station of the cellular communications network that the base station supports communications of local access packets, the local access IP address to the base station.

In example 29, the subject matter of example 28, or any of the examples herein, wherein the message is a Radio Resource Control (RRC) message.

In example 30, the subject matter of example 26, 27, or 28, or any of the examples herein, further comprising: receiving a second packet via the cellular link; determining, based on a presence of the local access field, whether the second packet is a local access packet; and when the second packet is determined to be a local access packet, changing a destination field of the second packet to the local access IP address.

In example 31, the subject matter of example 30, or any of the examples herein, wherein the logic is further to: remove a trailer field from the second packet; and deliver the second packet to an application layer of the UE.

In a 32$^{nd}$ example, a User Equipment (UE) device may comprise means for storing a local access Internet Protocol (IP) address obtained from a Wireless Local Area Network (WLAN); means for storing a cellular IP address associated with a cellular communications network; and means for transmitting a first packet, associated with the WLAN, via a cellular link of the cellular communications network, the transmission of the first packet including performing Network Address Translation (NAT) on the first packet to change a source IP address of the first packet from the local access IP address to the cellular IP address, and setting a local access field of the first packet to indicate that the first packet is a local access packet.

In example 33, the subject matter of example 32, or any of the examples herein, wherein the local access field includes a one-bit field that is added in a trailer section to the first packet.

In example 34, the subject matter of example 32, or any of the examples herein, further comprising: means for transmitting, in response to a message from a base station of the cellular communications network that the base station supports communications of local access packets, the local access IP address to the base station.

In example 35, the subject matter of example 32, or any of the examples herein, wherein the message is a Radio Resource Control (RRC) message.

In example 36, the subject matter of examples 32, 33, or 34, or any of the examples herein, further comprising: means for receiving a second packet via the cellular link; means for determining, based on a presence of the local access field, whether the second packet is a local access packet; and when the second packet is determined to be a local access packet, changing a destination field of the second packet to the local access IP address.

In example 37, the subject matter of example 36, or any of the examples herein, further comprising: means for removing a trailer field from the second packet; and means for delivering the second packet to an application layer of the UE.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 5A, 5B, 8A, 8B, and 10, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used.

What is claimed is:

1. User Equipment (UE) for a cellular communications network, the UE including:
   a baseband circuit to communicate with a Wireless Local Area Network (WLAN) and the cellular communications network; and
   processing circuitry to:
      store a local access Internet Protocol (IP) address obtained from a Wireless Local Area Network (WLAN);
      store a cellular IP address associated with the cellular communications network; and
      transmit a first packet, associated with the WLAN, via a cellular link of the cellular communications network, the transmission of the first packet including performing Network Address Translation (NAT) on the first packet to change a source IP address of the first packet from the local access IP address to the cellular IP address, and
      setting a local access field of the first packet to indicate that the first packet is a local access packet, wherein the local access field includes a one-bit field that is added in a trailer section to the first packet.

2. The UE of claim 1, wherein the processing circuitry is further to:
   transmit, in response to a message from a base station of the cellular communications network that the base station supports communications of local access packets, the local access IP address to the base station.

3. The UE of claim 2, wherein the message is a Radio Resource Control (RRC) message.

4. The UE of claim 1, wherein the processing circuitry is further to:
   receive a second packet via the cellular link;
   determine, based on a presence of the local access field, whether the second packet is a local access packet; and
   when the second packet is determined to be a local access packet, change a destination field of the second packet to the local access IP address.

5. The UE of claim 4, wherein the processing circuitry is further to:
   remove a trailer field from the second packet; and
   deliver the second packet to an application layer of the UE.

6. The UE of claim 1, wherein the processing circuitry is further to:
   transmit the local access IP address, to a base station and via the cellular link, as part of a RRCConnectionReconfigurationComplete message.

7. The UE of claim 1, wherein the first packet includes a trailer section, a checksum field, and an IP header with a protocol type;
   the transmission of the first packet is to further include:
      an update to the checksum field,
      an update to a length field of the trailer section, and
      an update to the protocol type of the IP header to indicate a presence of the trailer section.

8. The UE of claim 1, wherein the one-bit field indicates that the first packet was previously addressed using the cellular IP address and is intended for local access.

9. An apparatus for a baseband processor of User Equipment (UE) for a cellular communication network, the apparatus comprising:
- a computer-readable medium to store processing instructions; and
- processing circuitry to execute the processing instructions to:
  - store a local access Internet Protocol (IP) address obtained from a Wireless Local Area Network (WLAN);
  - store a cellular IP address associated with the cellular communications network; and
  - process a first packet, associated with the WLAN, for transmission via a cellular link of the cellular communications network, the processing of the first packet including
    - performing Network Address Translation (NAT) on the first packet to change a source IP address of the first packet from the local access IP address to the cellular IP address, and
    - setting a local access field of the first packet to indicate that the first packet is a local access packet; and
  - receive a second packet via the cellular link;
  - determine, based on a presence of the local access field, whether the second packet is a local access packet; and
  - when the second packet is determined to be a local access packet, changing a destination field of the second packet to the local access IP address.

10. The apparatus of claim 9, wherein the local access field includes a one-bit field that is added in a trailer section to the first packet.

11. The apparatus of claim 9, wherein the processing circuitry is further to:
- transmit, in response to a message from a base station of the cellular communications network that the base station supports communications of local access packets, the local access IP address to the base station.

12. The apparatus of claim 11, wherein the message is a Radio Resource Control (RRC) message.

13. The apparatus of claim 9, wherein the processing circuitry is further to:
- remove a trailer field from the second packet; and
- deliver the second packet to an application layer of the UE.

14. The apparatus of claim 9, wherein the processing circuitry is further to:
- transmit the local access IP address, to a base station and via the cellular link, as part of a RRCConnectionReconfigurationComplete message.

15. An evolved NodeB (eNB), associated with a cellular communications network, the eNB comprising:
- a Local Access Gateway (LA-GW) node to connect the eNB to a Wireless Local Area Network (WLAN) to receive local access packets, from the WLAN, that are destined for User Equipment (UE) that is attached to the eNB via a cellular radio link; and
- processing circuitry to:
  - process the received local access packets to change a destination Internet Protocol (IP) address of the local access packets to an IP address that is associated with the cellular communications network, and
  - insert a local access field to the received local access packets to indicate that the local access packets are associated with the WLAN; and
- radio frequency (RF) circuitry to transmit the local access packets over the cellular radio link.

16. The eNB of claim 15, wherein the processing circuitry is further to:
- encapsulate a payload of the local access packets when transmitting the local access packets over the cellular radio link.

17. The eNB of claim 15, wherein the local access field includes a one-bit field that is added in a trailer section of the local access packets.

18. The eNB of claim 15, wherein the processing circuitry is further to:
- receive a local access IP address, of the UE, from the UE.

19. The eNB of claim 18, wherein the local access IP address of the UE is received as part of a Radio Resource Control (RRC) message transmitted over the cellular radio link.

20. The eNB of claim 15, wherein the processing circuitry is further to:
- receive a second packet via the cellular radio link;
- determine, based on a presence of the local access field, whether the second packet is a local access packet; and
- when the second packet is determined to be a local access packet, changing a source field of the second packet to the local access IP address of the UE.

21. An apparatus to be implemented in a User Equipment (UE) for a cellular communications network, the apparatus including:
- a baseband circuit to communicate with a Wireless Local Area Network (WLAN) and the cellular communications network; and
- processing circuitry to:
  - store a local access Internet Protocol (IP) address obtained from a Wireless Local Area Network (WLAN);
  - store a cellular IP address associated with the cellular communications network; and
  - transmit a first packet, associated with the WLAN, via a cellular link of the cellular communications network, wherein the first packet includes a trailer section, a checksum field, and an IP header with a protocol type, and wherein the transmission of the first packet includes:
    - performing Network Address Translation (NAT) on the first packet to change a source IP address of the first packet from the local access IP address to the cellular IP address,
    - setting a local access field of the first packet to indicate that the first packet is a local access packet,
    - an update to the checksum field,
    - an update to a length field of the trailer section, and
    - an update to the protocol type of the IP header to indicate a presence of the trailer section.

22. The apparatus of claim 21, wherein the processing circuitry is further to:
- receive a second packet via the cellular link;
- determine, based on a presence of the local access field, whether the second packet is a local access packet; and
- when the second packet is determined to be a local access packet, change a destination field of the second packet to the local access IP address.

* * * * *